United States Patent
Kobayashi et al.

(10) Patent No.: US 10,979,650 B2
(45) Date of Patent: Apr. 13, 2021

(54) IMAGING CONTROL DEVICE, IMAGING APPARATUS, IMAGING CONTROL METHOD, AND IMAGING CONTROL PROGRAM (71) Applicant: FUJIFILM Corporation, Tokyo (JP)

(72) Inventors: Makoto Kobayashi, Saitama (JP); Ryo Hasegawa, Saitama (JP); Hitoshi Sakurabu, Saitama (JP); Tomonori Masuda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/017,641

(22) Filed: Sep. 10, 2020

(65) Prior Publication Data
US 2020/0412935 A1 Dec. 31, 2020

Related U.S. Application Data
(63) Continuation of application No. PCT/JP2019/008922, filed on Mar. 6, 2019.

(30) Foreign Application Priority Data
Mar. 13, 2018 (JP) ................ 2018-045932

(51) Int. Cl.
*H04N 5/235* (2006.01)
(52) U.S. Cl.
CPC ......... *H04N 5/2357* (2013.01); *H04N 5/2352* (2013.01)
(58) Field of Classification Search
CPC .................................................. H04N 5/2357
(Continued)

(56) References Cited

U.S. PATENT DOCUMENTS

| 2007/0085912 A1* | 4/2007 | Hakola | H04N 5/2357 348/227.1 |
| 2015/0281547 A1 | 10/2015 | Terasawa | |
| 2017/0339326 A1* | 11/2017 | Rycenga | H04N 5/2252 |

FOREIGN PATENT DOCUMENTS

| JP | S56149180 | 11/1981 |
| JP | S62112272 | 7/1987 |

(Continued)

OTHER PUBLICATIONS

"International Search Report (Form PCT/ISA/210) of PCT/JP2019/008922," dated May 28, 2019, with English translation thereof, pp. 1-3.

(Continued)

*Primary Examiner* — Anthony J Daniels
(74) *Attorney, Agent, or Firm* — JCIPRNET (57) ABSTRACT

An imaging control device includes: an imaging controller that obtains captured image data by controlling an imager imaging a subject through an optical element having variable transmittance of light; a flicker detector that detects a flicker occurring in the captured image data based on the captured image data; and a transmittance controller that controls, based on the flicker, the transmittance of the optical element to a state where a quantity of light incident on the imager is changed in a cycle shorter than a cycle of the flicker, and the imaging controller controls an exposure time of the imager to a natural multiple of a changing cycle of the quantity of light incident on the imager in a condition where the transmittance of the optical element is controlled to the state.

13 Claims, 9 Drawing Sheets

(58) Field of Classification Search
USPC .................................................... 348/226.1
See application file for complete search history.

(56) References Cited

FOREIGN PATENT DOCUMENTS

| JP | 2002077716 | 3/2002 |
| JP | 2015198292 | 11/2015 |

OTHER PUBLICATIONS

"Written Opinion of the International Searching Authority (Form PCT/ISA/237) of PCT/JP2019/008922," dated May 28, 2019, with English translation thereof, pp. 1-7.

\* cited by examiner

IMAGING CONTROL DEVICE, IMAGING APPARATUS, IMAGING CONTROL METHOD, AND IMAGING CONTROL PROGRAM

CROSS REFERENCE TO RELATED APPLICATION

This is a continuation of International Application No. PCT/JP2019/008922 filed on Mar. 6, 2019, and claims priority from Japanese Patent Application No. 2018-045932 filed on Mar. 13, 2018, the entire disclosures of which are incorporated herein by reference.

BACKGROUND OF THE INVENTION

1. Field of the Invention

The present invention relates to an imaging control device, an imaging apparatus, an imaging control method, and a non-transitory computer readable medium storing an imaging control program.

2. Description of the Related Art

In a case where imaging is performed under a fluorescent lamp, unevenness (hereinafter, referred to as a "flicker") having a shape of horizontal streaks may occur in a captured image due to an effect of a periodic change in brightness caused by a blinking cycle (for example, in the case of a 50 Hz (hertz) or 60 Hz commercial power supply, $1/100$ seconds or $1/120$ seconds) of a light source of the fluorescent lamp. Hereinafter, the flicker caused by the 50 Hz commercial power supply will be referred to as a 50 Hz flicker, and the flicker caused by the 60 Hz commercial power supply will be referred to as a 60 Hz flicker.

JP2015-198292A discloses control of transmittance of a light reduction filter arranged ahead of an imager to a target exposure amount for each frame based on a blinking cycle of a fluorescent lamp.

JP2002-077716A discloses flicker suppression performed by detecting a blinking cycle of a fluorescent lamp and controlling transmittance of a stop (or an optical shutter of liquid crystals or the like) based on the blinking cycle.

SUMMARY OF THE INVENTION

Generally, the 60 Hz flicker can be suppressed by setting an exposure time to a natural multiple of (a multiplication by a natural number of) $1/120$ seconds. The 50 Hz flicker can be suppressed by setting the exposure time to a natural multiple of $1/100$ seconds. However, in the case of performing imaging in an exposure time shorter than the blinking cycle of the fluorescent lamp, the flicker cannot be suppressed based on control of the exposure time.

In the method disclosed in JP2015-198292A, the transmittance of the light reduction filter is controlled in units of pixel lines. Thus, control of the light reduction filter is complicated.

JP2002-077716A achieves the flicker suppression by controlling the stop or the light reduction filter but does not disclose a detailed control method.

The present invention is conceived in view of the above matter, and an object thereof is to provide an imaging control device, an imaging apparatus, an imaging control method, and an imaging control program capable of suppressing a flicker in a case of performing imaging in an exposure time shorter than a blinking cycle of a light source by simple control.

An imaging control device of the present invention comprises an imaging controller that obtains captured image data by controlling an imager imaging a subject through an optical element having variable transmittance of light, a flicker detector that detects a flicker occurring in the captured image data based on the captured image data, and a transmittance controller that controls the transmittance of the optical element to a state where a quantity of light incident on the imager is changed in a cycle shorter than a cycle of the flicker based on the flicker, in which the imaging controller controls an exposure time of the imager to a natural multiple of a changing cycle of the quantity of light incident on the imager in a condition where the transmittance of the optical element is controlled to the state.

An imaging apparatus of the present invention comprises the imaging control device, and the imager.

An imaging control method of the present invention comprises an imaging control step of obtaining captured image data by controlling an imager imaging a subject through an optical element having variable transmittance of light, a flicker detection step of detecting a flicker occurring in the captured image data based on the captured image data, and a transmittance control step of controlling the transmittance of the optical element to a state where a quantity of light incident on the imager is changed in a cycle shorter than a cycle of the flicker based on the flicker, in which in the imaging control step, an exposure time of the imager is controlled to a natural multiple of a changing cycle of the quantity of light incident on the imager in a condition where the transmittance of the optical element is controlled to the state.

An imaging control program of the present invention is a program causing a computer to execute an imaging control step of obtaining captured image data by controlling an imager imaging a subject through an optical element having variable transmittance of light, a flicker detection step of detecting a flicker occurring in the captured image data based on the captured image data, and a transmittance control step of controlling the transmittance of the optical element to a state where a quantity of light incident on the imager is changed in a cycle shorter than a cycle of the flicker based on the flicker, in which in the imaging control step, an exposure time of the imager is controlled to a natural multiple of a changing cycle of the quantity of light incident on the imager in a condition where the transmittance of the optical element is controlled to the state.

According to the present invention, an imaging control device, an imaging apparatus, an imaging control method, and an imaging control program capable of suppressing a flicker in a case of performing imaging in an exposure time shorter than a blinking cycle of a light source by simple control can be provided.

DESCRIPTION OF THE PREFERRED EMBODIMENTS

Hereinafter, an embodiment of the present invention will be described with reference to the drawings.

Figure 1:
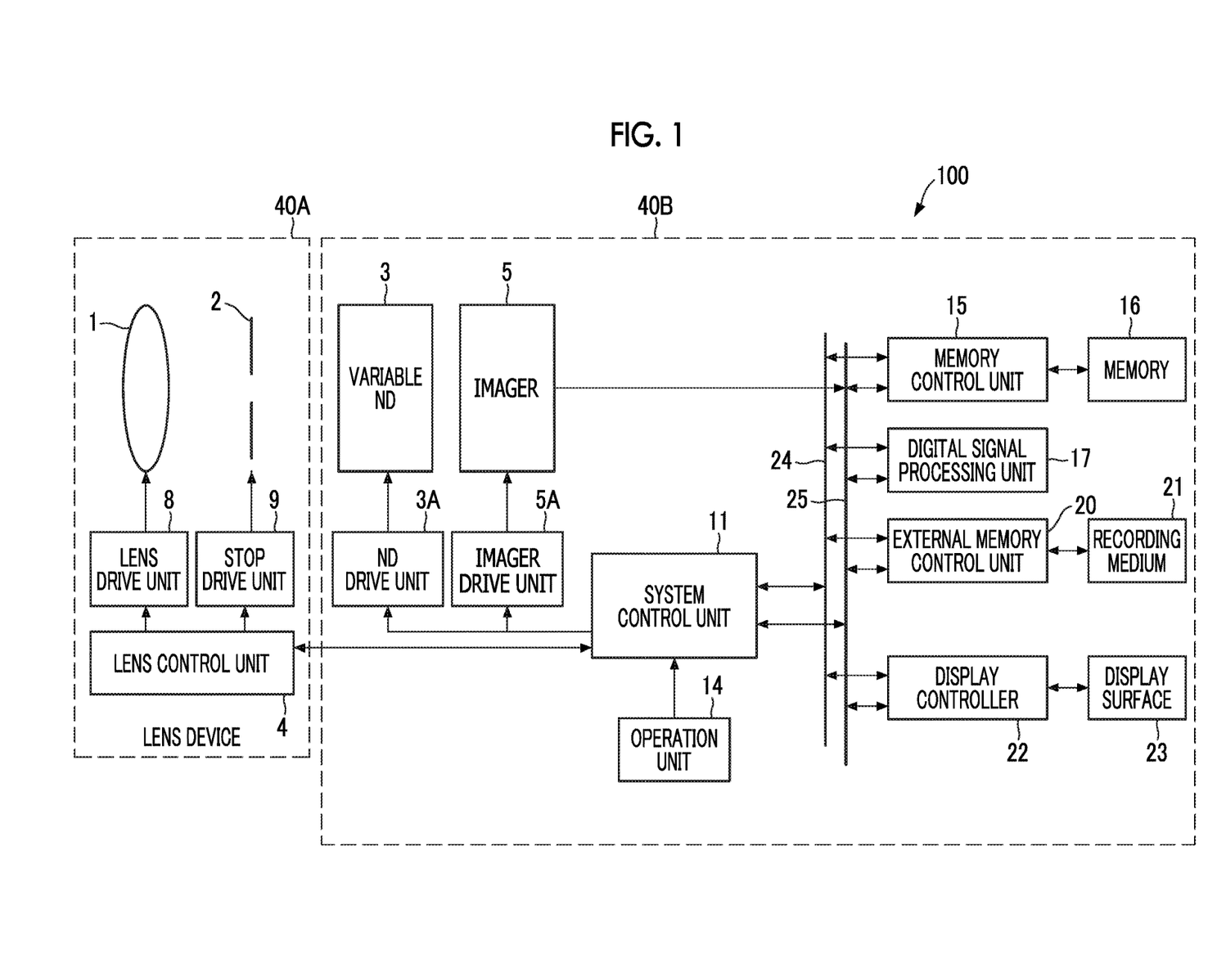
FIG. 1 is a diagram illustrating a schematic configuration of a digital camera 100 that is an imaging apparatus according to one embodiment of the present invention.

FIG. 1 is a diagram illustrating a schematic configuration of a digital camera 100 that is an imaging apparatus according to one embodiment of the present invention.

The digital camera 100 illustrated in FIG. 1 comprises a lens device 40 that includes an imaging lens 1, a stop 2, a lens control unit 4, a lens drive unit 8, and a stop drive unit 9; and a main body unit 40B.

The lens device 40A may be attachable and detachable with respect to the main body unit 40B or may be integrated with the main body unit 40B. In a configuration in which the lens device 40A is attachable and detachable with respect to the main body unit 40B, the main body unit 40B constitutes the imaging apparatus.

The imaging lens 1 includes a focus lens, a zoom lens, or the like that can be moved in an optical axis direction.

The lens control unit 4 of the lens device 40A is configured to be capable of communicating with a system control unit 11 of the main body unit 40B in a wired or wireless manner.

In accordance with an instruction from the system control unit 11, the lens control unit 4 changes the position of a principal point of the focus lens by controlling the focus lens included in the imaging lens 1 through the lens drive unit 8, changes the position of the zoom lens by controlling the zoom lens included in the imaging lens 1 through the lens drive unit 8, or controls an F number of the stop 2 through the stop drive unit 9.

The main body unit 40B comprises an imager 5 such as a charged coupled device (CCD) type image sensor or a metal oxide semiconductor (MOS) type image sensor that images a subject through an imaging optical system including the imaging lens 1 and the stop 2, an imager drive unit 5A that drives the imager 5, a neutral density (ND) filter 3 that is arranged between the imager 5 and the imaging optical system, an ND drive unit 3A that drives the variable ND filter 3, the system control unit 11 that manages and controls the entire main body unit 40B, and an operation unit 14.

The imager 5 includes an imaging surface on which a plurality of pixels are two-dimensionally arranged, converts a subject image formed on the imaging surface by the imaging optical system into pixel signals by the plurality of pixels, and outputs the pixel signals. Hereinafter, a set of pixel signals output from the pixels of the imager 5 will be referred to as a captured image signal.

The imager drive unit 5A drives the imager 5 by generating a drive signal based on an instruction from the system control unit 11 and supplying the drive signal to the imager 5.

The variable ND filter 3 is an optical element having variable transmittance and is configured to be capable of adjusting the transmittance of light in accordance with an applied voltage. For example, a liquid crystal element is used in the variable ND filter 3. By adjusting the transmittance of light of the variable ND filter 3 in accordance with the applied voltage, the quantity of subject light incident on the imaging surface of the imager 5 is adjusted.

The variable ND filter 3 may be integrally formed with the imager 5. For example, the imager 5 comprises an imager chip, a package that accommodates the imager chip, and a protective cover that seals the package. The variable ND filter 3 may be laminated on the protective cover.

The ND drive unit 3A controls the transmittance of the variable ND filter 3 by controlling a voltage applied to the variable ND filter 3 in accordance with an instruction from the system control unit 11.

The system control unit 11 manages and controls the entire digital camera 100. A hardware structure of the system control unit 11 corresponds to various processors that perform processing by executing programs including an imaging control program.

The various processors include a central processing unit (CPU) that is a general-purpose processor performing various types of processing by executing a program, a programmable logic device (PLD) that is a processor of which a circuit configuration can be changed after manufacturing like a field programmable gate array (FPGA), or a dedicated electric circuit that is a processor having a circuit configuration dedicatedly designed to execute a specific type of processing like an application specific integrated circuit (ASIC).

More specifically, a structure of the various processors is an electric circuit in which circuit elements such as semiconductor elements are combined.

The system control unit 11 may be configured with one of the various processors or may be configured with a combination of two or more processors of the same type or different types (for example, a combination of a plurality of FPGAs or a combination of a CPU and an FPGA).

The main body unit 40B further comprises a memory 16 including a random access memory (RAM) and a read only memory (ROM), a memory control unit 15 that controls data storage in the memory 16 and data read from the memory 16, a digital signal processing unit 17 that generates captured image data in accordance with various formats such as Joint Photographic Experts Group (JPEG) format by performing digital signal processing on the captured image signal output from the imager 5, an external memory control unit 20 that controls data storage in a storage medium 21 and data read from the storage medium 21, the display surface 23 configured with an organic electroluminescence (EL) panel, a liquid crystal panel, or the like, and a display controller 22 that controls display on the display surface 23.

The ROM included in the memory 16 stores programs executed by the system control unit 11 including the imaging control program.

The memory control unit 15, the digital signal processing unit 17, the external memory control unit 20, and the display controller 22 are connected to each other through a control bus 24 and a data bus 25 and are controlled by instructions from the system control unit 11.

A hardware structure of the digital signal processing unit 17 corresponds to the above illustrated various processors that perform processes by executing programs.

Figure 2:
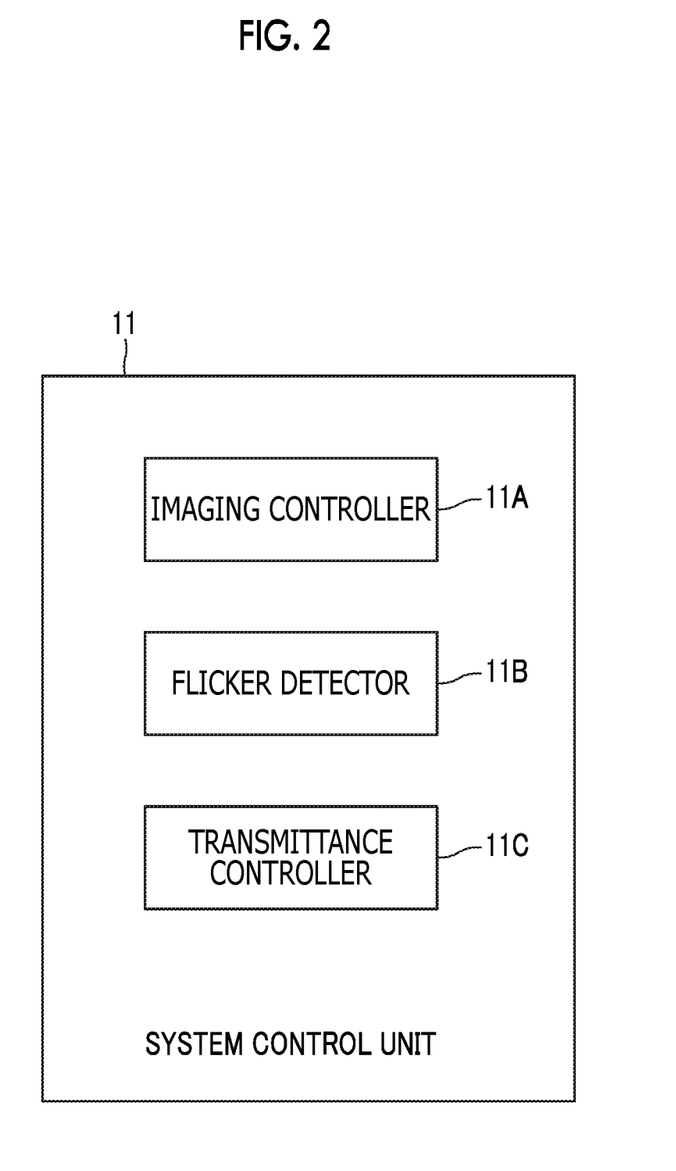
FIG. 2 is a function block diagram of a system control unit 11 illustrated in FIG. 1.

FIG. 2 is a function block diagram of the system control unit 11 illustrated in FIG. 1. By executing programs stored in the ROM of the memory 16 including an imaging control program, the system control unit 11 functions as an imaging control device comprising an imaging controller 11A that executes an imaging control step, a flicker detector 11B that executes a flicker detection step, and a transmittance controller 11C that executes a transmittance control step.

The imaging controller 11A images the subject by controlling the imager 5 and acquires captured image data that is generated by the digital signal processing unit 17 by the imaging.

The flicker detector 11B detects a flicker occurring in the captured image data based on the captured image data acquired by the imaging controller 11A. In a case where the flicker occurs in the captured image data, for example, a high brightness region of relatively high brightness extending in one direction and a low brightness region of relatively low brightness extending the one direction alternately appear in a direction perpendicular to the one direction.

An amplitude value of the flicker corresponding to the quantity of light from a light source (hereinafter, referred to as the flicker light source) causing the flicker can be obtained by obtaining a difference between the brightness of the high brightness region and the brightness of the low brightness region. In addition, a changing cycle (hereinafter, referred to as the flicker cycle) of the quantity of light from the flicker light source can be obtained from the frequency of appearance of the high brightness region and the low brightness region. The amplitude value and the flicker cycle are parameters of the detected flicker.

The transmittance controller 11C controls the transmittance of the variable ND filter 3 to a state where the quantity of the subject light incident on the imager 5 is changed in a cycle shorter than the cycle of the flicker based on the parameters of the flicker detected by the flicker detector 11B.

Figure 3:
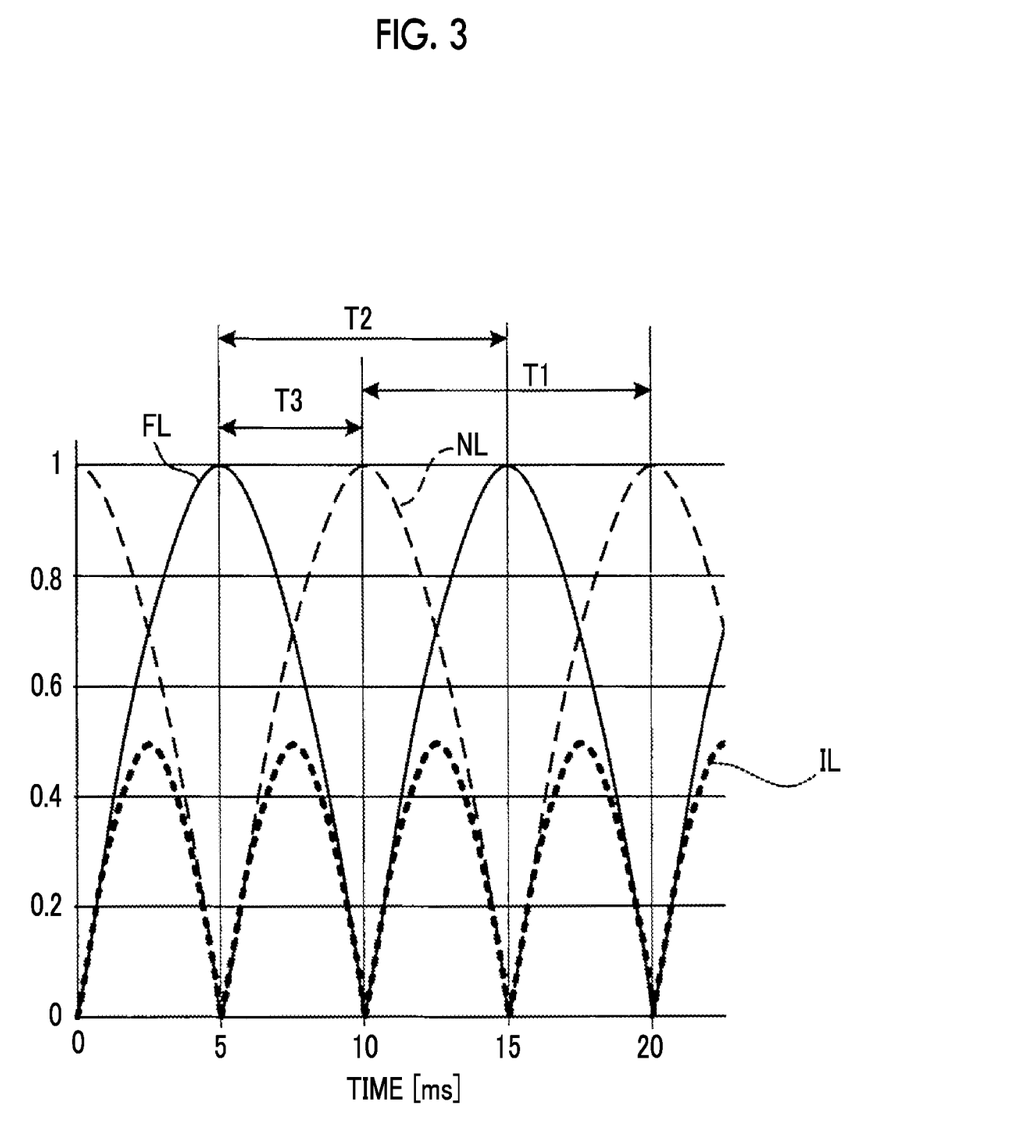
FIG. 3 is a diagram for describing a control content of a transmittance controller 11C illustrated in FIG. 2.

FIG. 3 is a diagram for describing a control content of the transmittance controller 11C illustrated in FIG. 2. In FIG. 3, a flicker waveform FL that is a waveform indicating the flicker detected by the flicker detector 11B, a transmittance waveform NL that indicates the transmittance of the variable ND filter 3, and a subject light quantity waveform IL that indicates the quantity of the subject light incident on the imager 5 are illustrated.

In FIG. 3, each waveform is illustrated by standardizing the lowest value (state where the quantity of light of the flicker light source is lowest) of the flicker waveform FL to "0" and standardizing the highest value (state where the quantity of light of the flicker light source is highest) of the flicker waveform FL to "1". The transmittance of the variable ND filter 3 is highest in a case where the transmittance waveform NL is "1", and the transmittance of the variable ND filter 3 is lowest in a case where the transmittance waveform NL is "0". A horizontal axis in FIG. 3 denotes time.

As illustrated in FIG. 3, the transmittance controller 11C changes the transmittance of the variable ND filter 3 in a constant cycle T2 that is shifted in phase with respect to a cycle T1 of the flicker waveform FL by 90 degrees. Each of the flicker waveform FL and the transmittance waveform NL is a waveform of an absolute value of a sine wave. Furthermore, the amplitude of the cycle T1 of the flicker waveform FL and the amplitude of the cycle T2 of the transmittance waveform NL are the same. The cycle of the waveform in the present specification indicates an interval between timings at which the waveform has the lowest value.

In a case where the transmittance of the variable ND filter 3 is controlled, the quantity of the subject light incident on the imager 5 is changed in a cycle T3 that is half of the cycle T1 of the flicker waveform FL as illustrated by the subject light quantity waveform IL in FIG. 3.

In a state where the transmittance of the variable ND filter 3 is controlled by the transmittance controller 11C as illustrated in FIG. 3, the imaging controller 11A controls an exposure time of the imager 5 to a natural multiple of the changing cycle (cycle T3 in FIG. 3) of the quantity of the subject light. Accordingly, occurrence of the flicker in the captured image data obtained by imaging the subject by the imager 5 in the control state is suppressed.

In the case of controlling transmittance to a constant value by the transmittance controller 11C, for example, the exposure time of the imager 5 needs to be set to a natural multiple of 1/100 seconds in order to suppress the flicker having a cycle of 1/100 seconds.

Meanwhile, in a case where transmittance is controlled as in FIG. 3, the flicker can be suppressed even by setting the exposure time of the imager 5 to a natural multiple of 1/200 seconds since the cycle T3 of the subject light quantity waveform IL is ½ of the cycle T1 of the flicker waveform FL. Accordingly, the flicker can be suppressed even in imaging in a very short exposure time, and high-speed imaging can be performed with high image quality.

According to the digital camera 100, the flicker can be suppressed by simply controlling the transmittance of the entire variable ND filter 3 in a uniform manner. Thus, control can be simplified compared to a method of controlling transmittance for each pixel line as in JP2015-198292A.

A method of controlling transmittance by the transmittance controller 11C is not limited to the method illustrated in FIG. 3. For example, while the ratio of transmittance at a timing at which the flicker waveform FL has the highest value and transmittance at a timing at which the flicker waveform FL has the lowest value is set to match the ratio of the highest value of the flicker waveform FL and the lowest value of the flicker waveform FL in FIG. 3, these ratios may not be set to match by setting the highest value of the transmittance waveform NL to a value smaller than "1" in FIG. 3.

Figure 4:
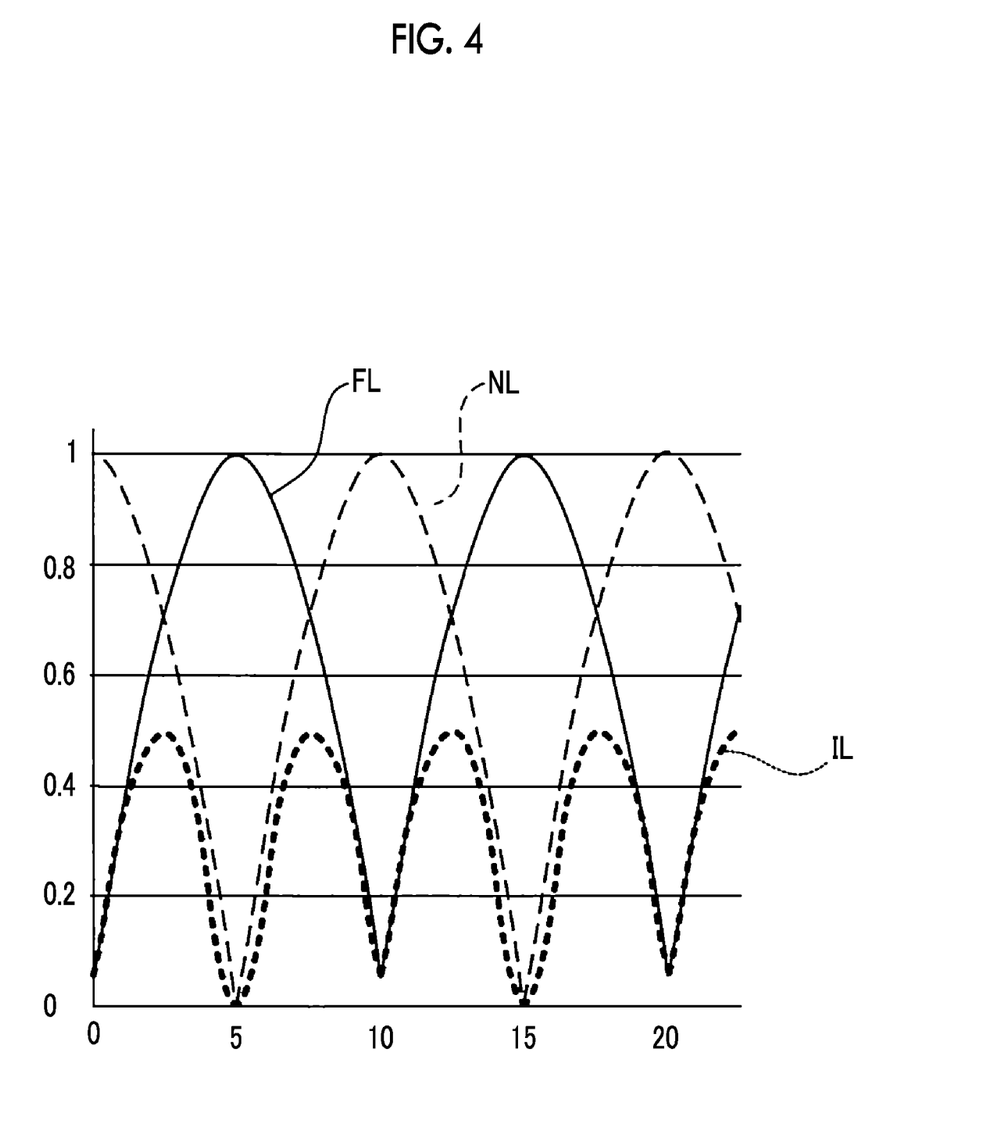
FIG. 4 is a diagram illustrating a reference example in a case where a lowest value of a flicker waveform FL is not zero.

However, the amount of light emission may not be zero depending on the flicker light source. In this case, in a case where transmittance is controlled as illustrated in FIG. 3, the cycle of the subject light quantity waveform IL cannot be set to be shorter than the cycle of the flicker waveform FL as illustrated in FIG. 4 as a reference example.

Figure 5:
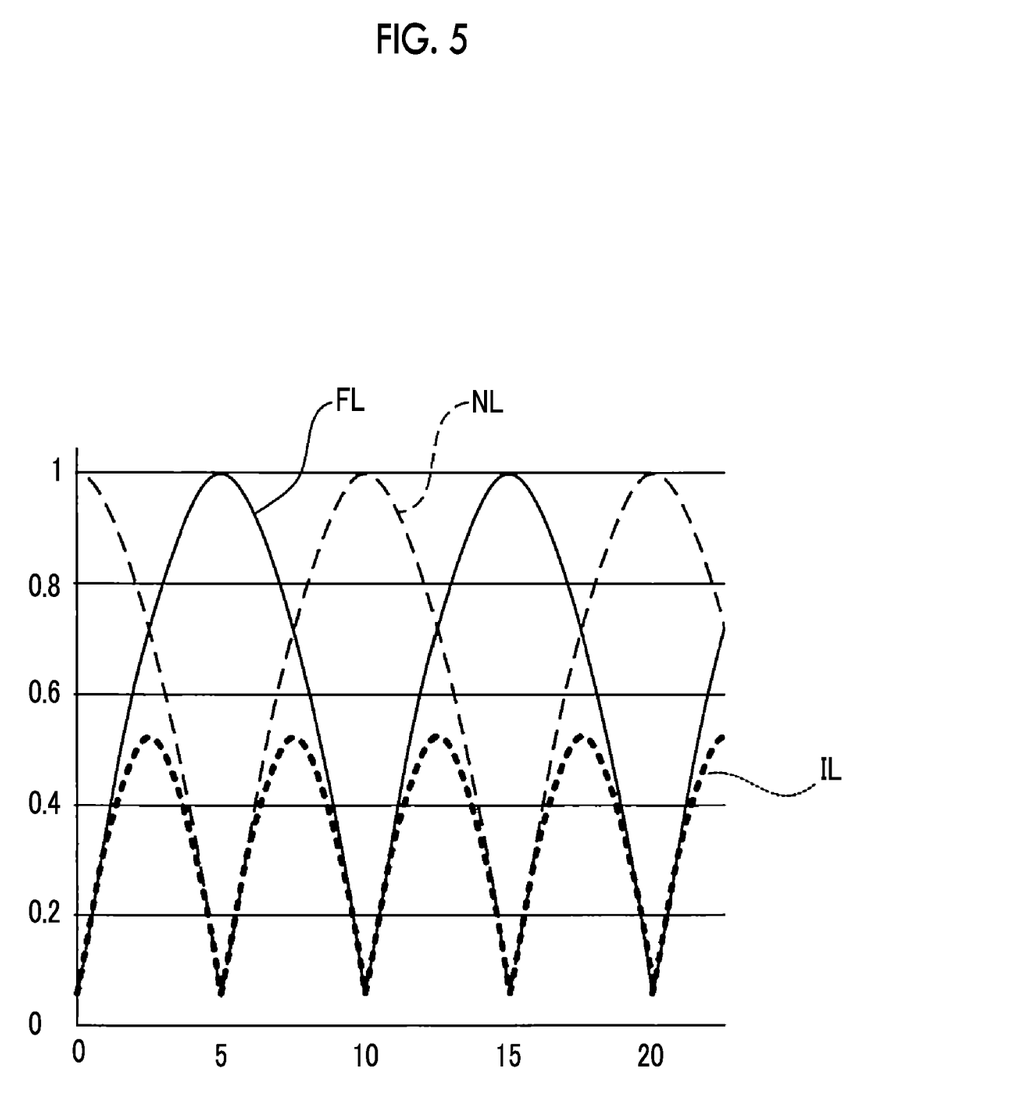
FIG. 5 is a diagram illustrating a preferred control example of transmittance in a case where the lowest value of the flicker waveform FL is not zero.

Thus, considering imaging under the flicker light source in which the amount of light emission is not zero even in a case where the amount of light emission is smallest, it is preferable to control the transmittance of the variable ND filter 3 such that the ratio of the value of the transmittance waveform NL at a timing at which the flicker waveform FL is lowest and the value of the transmittance waveform NL at a timing at which the flicker waveform FL is highest matches the ratio of the highest value and the lowest value of the flicker waveform FL (ratio of the brightness of the high brightness region and the brightness of the low brightness region in the captured image data) as illustrated in FIG. 5. Accordingly, even under the flicker light source in which the amount of light emission is not zero even in a case where the amount of light emission is smallest, high-speed imaging can be performed with high image quality.

Figure 6:
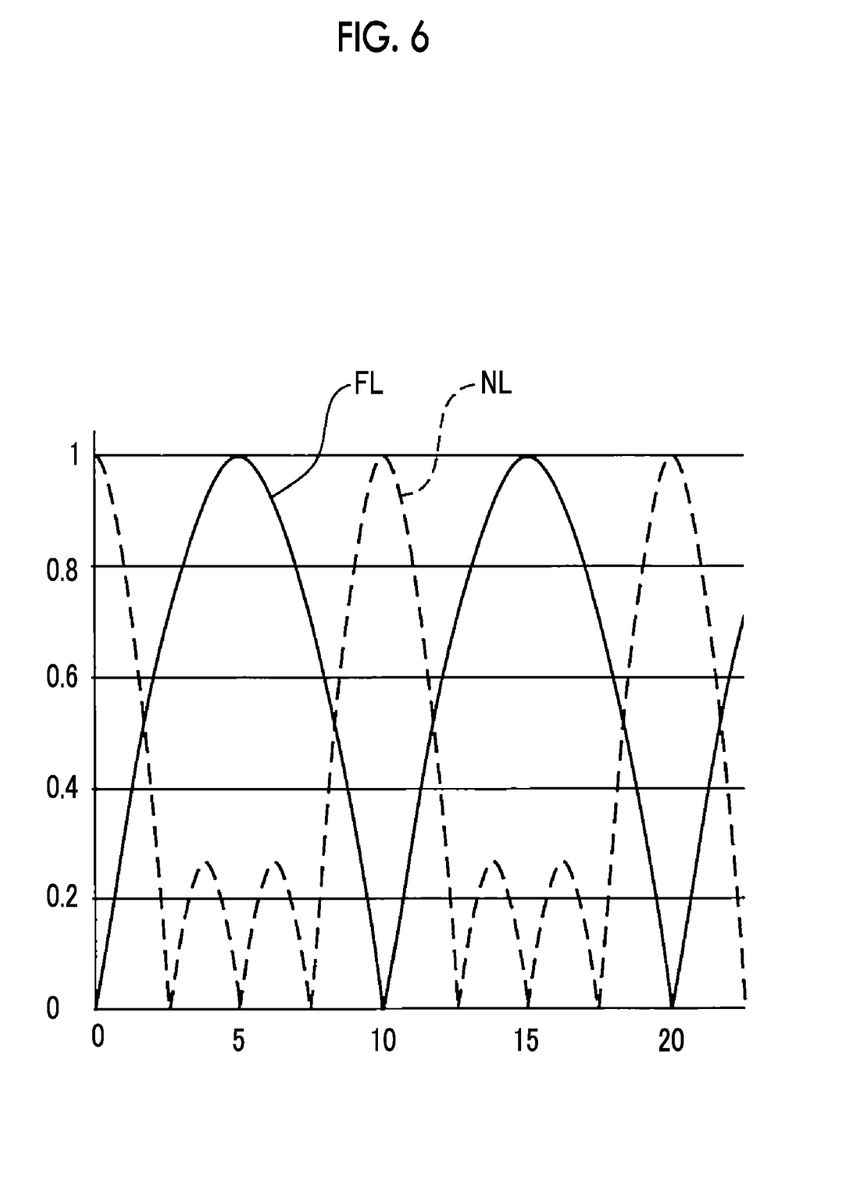
FIG. 6 is a diagram for describing a modification example of the control content of the transmittance controller 11C illustrated in FIG. 2.

While the cycle T2 of the transmittance waveform NL is set to be the same as the cycle T1 of the flicker waveform FL in the examples in FIG. 3 and FIG. 5, the present invention is not limited to the examples. For example, as illustrated in FIG. 6, the cycle of the transmittance waveform NL may be controlled to a cycle shorter than the cycle of the flicker waveform FL. FIG. 6 illustrates an example in which the cycle of the transmittance waveform NL is not constant.

Figure 7:
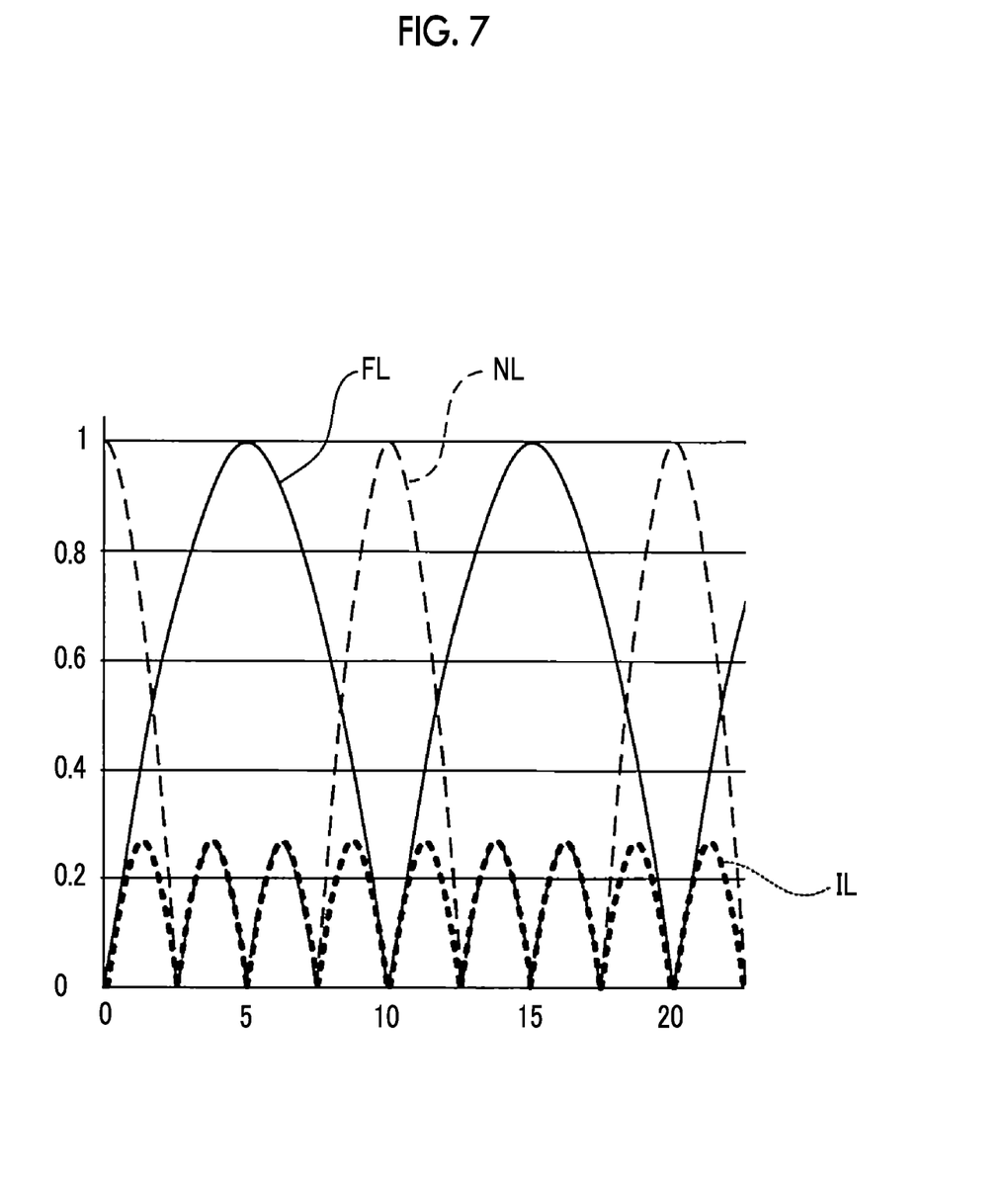
FIG. 7 is a diagram for describing the modification example of the control content of the transmittance controller 11C illustrated in FIG. 2.

By controlling the transmittance of the variable ND filter 3 in accordance with the transmittance waveform NL illustrated in FIG. 6, the quantity of the subject light incident on the imager 5 can be set to ¼ of the cycle of the flicker waveform FL as illustrated by the subject light quantity waveform IL in FIG. 7. Thus, the flicker can be suppressed even by setting the exposure time of the imager 5 to a natural multiple of ¹⁄₄₀₀ seconds.

As illustrated in FIG. 7, in order to set the cycle of the subject light quantity waveform IL to less than or equal to ¼ of the cycle of the flicker waveform FL, the transmittance of the variable ND filter 3 may be changed in accordance with a function NL(t) of time t obtained by calculating Expression (1) below in a case where f denotes the frequency of the flicker waveform FL, t denotes time, k denotes a natural number greater than or equal to 2, and π denotes a circular constant.

$$NL(t)=|\sin\{2\pi ft+(\pi/2)\}|\times|\sin\{2\pi fkt+(\pi/2)\}| \qquad (1)$$

For example, in a case where k is set to 3, the cycle of the subject light quantity waveform IL can be set to ⅙ of the cycle of the flicker waveform FL, and exposure can be performed in a further short time period.

As illustrated in FIG. 3, in the case of setting the cycle of the subject light quantity waveform IL to ½ of the cycle of the flicker waveform FL, the transmittance of the variable ND filter 3 may be changed in accordance with $NL(t)=|\sin\{2\pi ft+(\pi/2)\}|$.

Next, a configuration of a smartphone as the imaging apparatus according to the embodiment of the present invention will be described.

Figure 8:
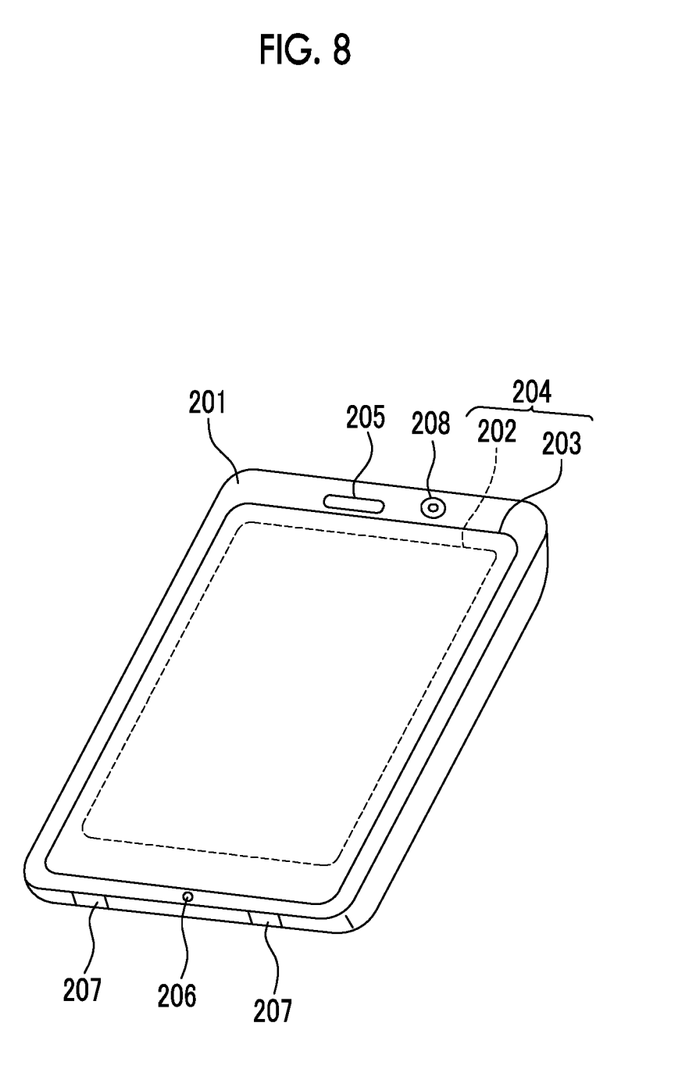
FIG. 8 illustrates an exterior of a smartphone 200 that is the imaging apparatus according to one embodiment of the present invention.

FIG. 8 illustrates an exterior of a smartphone 200 that is the imaging apparatus according to one embodiment of the present invention.

The smartphone 200 illustrated in FIG. 8 includes a casing 201 having a flat plate shape and comprises a display and input unit 204 in which a display panel 202 as a display surface and an operation panel 203 as an input unit are integrated on one surface of the casing 201.

The casing 201 comprises a speaker 205, a microphone 206, an operation unit 207, and a camera unit 208. The configuration of the casing 201 is not for limitation and may employ, for example, a configuration in which the display surface and the input unit are independently disposed, or a configuration that has a folded structure or a sliding mechanism.

Figure 9:
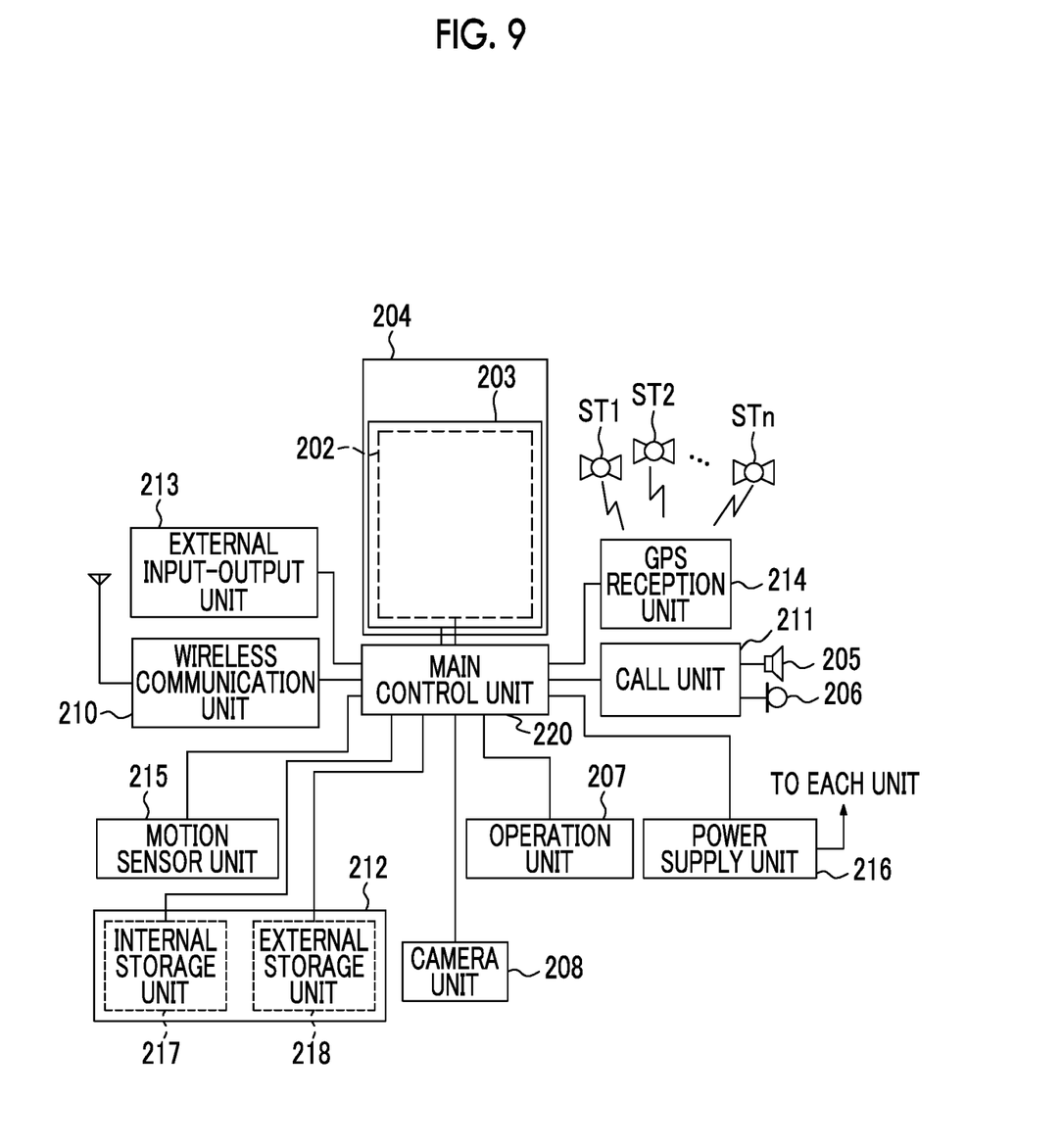
FIG. 9 is a block diagram illustrating a configuration of the smartphone 200 illustrated in FIG. 8.

FIG. 9 is a block diagram illustrating a configuration of the smartphone 200 illustrated in FIG. 8.

As illustrated in FIG. 9, a wireless communication unit 210, the display and input unit 204, a call unit 211, the operation unit 207, the camera unit 208, a storage unit 212, an external input-output unit 213, a global positioning system (GPS) reception unit 214, a motion sensor unit 215, a power supply unit 216, and a main control unit 220 are comprised as main constituents of the smartphone.

In addition, a wireless communication function of performing mobile wireless communication with a base station apparatus BS, not illustrated, through a mobile communication network NW, not illustrated, is provided as a main function of the smartphone 200.

The wireless communication unit 210 performs wireless communication with the base station apparatus BS accommodated in the mobile communication network NW in accordance with an instruction from the main control unit 220. By using the wireless communication, transmission and reception of various file data such as voice data and image data, electronic mail data, or the like and reception of web data, streaming data, or the like are performed.

The display and input unit 204 is a so-called touch panel that visually delivers information to the user by displaying images (still images and motion images), text information, or the like and detects a user operation with respect to the displayed information under control of the main control unit 220. The display and input unit 204 comprises the display panel 202 and the operation panel 203.

The display panel 202 uses a liquid crystal display (LCD), an organic electro-luminescence display (OELD), or the like as a display device.

The operation panel 203 is a device that is placed such that an image displayed on the display surface of the display panel 202 can be visually recognized, is operated by a finger of the user or a stylus, and detects one or a plurality of coordinates. In a case where the device is operated by the finger of the user or the stylus, a detection signal generated by the operation is output to the main control unit 220. Next, the main control unit 220 detects an operation position (coordinates) on the display panel 202 based on the received detection signal.

As illustrated in FIG. 9, the display panel 202 and the operation panel 203 of the smartphone 200 illustrated as the imaging apparatus according to one embodiment of the present invention are integrated and constitute the display and input unit 204. The operation panel 203 is arranged to completely cover the display panel 202.

In a case where such arrangement is employed, the operation panel 203 may have a function of detecting the user operation even in a region outside the display panel 202. In other words, the operation panel 203 may comprise a detection region (hereinafter, referred to as a display region) for an overlapping part in overlap with the display panel 202 and a detection region (hereinafter, referred to as a non-display region) for an edge part other than the overlapping part that is not in overlap with the display panel 202.

The size of the display region and the size of the display panel 202 may completely match, but both sizes do not need to match. In addition, the operation panel 203 may comprise two sensitive regions of the edge part and an inner part other than the edge part. Furthermore, the width of the edge part is appropriately designed depending on the size and the like of the casing 201.

Furthermore, as a position detection method employed in the operation panel 203, a matrix switch method, a resistive film method, a surface acoustic wave method, an infrared method, an electromagnetic induction method, an electrostatic capacitive method, and the like are exemplified, and any of the methods can be employed.

The call unit 211 comprises the speaker 205 or the microphone 206 and converts voice of the user input through the microphone 206 into voice data processable in the main control unit 220 and outputs the voice data to the main control unit 220, or decodes voice data received by the wireless communication unit 210 or the external input-output unit 213 and outputs the decoded voice data from the speaker 205.

In addition, as illustrated in FIG. 8, for example, the speaker 205 can be mounted on the same surface as a surface on which the display and input unit 204 is disposed, and the microphone 206 can be mounted on a side surface of the casing 201.

The operation unit 207 is a hardware key that uses a key switch or the like, and receives an instruction from the user. For example, as illustrated in FIG. 8, the operation unit 207 is a push-button type switch that is mounted on a side surface of the casing 201 of the smartphone 200 and enters an ON state in a case where the switch is pressed by the finger or the like, and enters an OFF state by restoring force of a spring or the like in a case where the finger is released.

The storage unit 212 stores a control program and control data of the main control unit 220, application software, address data in which a name, a telephone number, or the like of a communication counterpart is associated, transmitted and received electronic mail data, web data downloaded by web browsing, and downloaded contents data, and temporarily stores streaming data or the like. In addition, the storage unit 212 is configured with an internal storage unit 217 incorporated in the smartphone and an external storage unit 218 that includes a slot for an attachable and detachable external memory.

Each of the internal storage unit 217 and the external storage unit 218 constituting the storage unit 212 is implemented using a storage medium such as a memory (for example, a MicroSD (registered trademark) memory) of a flash memory type, a hard disk type, a multimedia card micro type, or a card type, a random access memory (RAM), or a read only memory (ROM).

The external input-output unit 213 is an interface with all external apparatuses connected to the smartphone 200 and is directly or indirectly connected to other external apparatuses by communication or the like (for example, Universal Serial Bus (USB) or IEEE1394) or through a network (for example, the Internet, a wireless LAN, Bluetooth (registered trademark), radio frequency identification (RFID), infrared communication (Infrared Data Association (IrDA) (registered trademark)), Ultra Wideband (UWB) (registered trademark), or ZigBee (registered trademark)).

For example, the external apparatuses connected to the smartphone 200 include a wired/wireless headset, a wired/wireless external charger, a wired/wireless data port, a memory card and a subscriber identity module (SIM)/user identity module (UIM) card connected through a card socket, an external audio and video apparatus connected through an audio and video input/output (I/O) terminal, a wirelessly connected external audio and video apparatus, a smartphone connected in a wired/wireless manner, a personal computer connected in a wired/wireless manner, and an earphone.

The external input-output unit 213 can deliver data transferred from the external apparatuses to each constituent in the smartphone 200 or transfer data in the smartphone 200 to the external apparatuses.

The GPS reception unit 214 receives GPS signals transmitted from GPS satellites ST1 to STn, executes a position measurement calculation process based on the received plurality of GPS signals, and detects a position that includes a latitude, a longitude, and an altitude of the smartphone 200 in accordance with an instruction from the main control unit 220. In a case where positional information can be acquired from the wireless communication unit 210 or the external input-output unit 213 (for example, a wireless LAN), the GPS reception unit 214 can detect the position using the positional information.

The motion sensor unit 215 comprises, for example, a three-axis acceleration sensor and detects a physical motion of the smartphone 200 in accordance with an instruction from the main control unit 220. By detecting the physical motion of the smartphone 200, a movement direction or an acceleration of the smartphone 200 is detected. The detection result is output to the main control unit 220.

The power supply unit 216 supplies power stored in a battery (not illustrated) to each unit of the smartphone 200 in accordance with an instruction from the main control unit 220.

The main control unit 220 comprises a microprocessor, operates in accordance with the control program and the control data stored in the storage unit 212, and manages and controls each unit of the smartphone 200. In addition, the main control unit 220 has a mobile communication control function of controlling each unit of a communication system and an application processing function for performing voice communication or data communication through the wireless communication unit 210.

The application processing function is implemented by operating the main control unit 220 in accordance with the application software stored in the storage unit 212. For example, the application processing function is an infrared communication function of performing data communication with an opposing apparatus by controlling the external input-output unit 213, an electronic mail function of transmitting and receiving electronic mails, or a web browsing function of browsing a web page.

In addition, the main control unit 220 has an image processing function such as displaying a video on the display and input unit 204 based on image data (data of a still image or a motion image) such as reception data or downloaded streaming data.

The image processing function refers to a function of causing the main control unit 220 to decode the image data, perform image processing on the decoding result, and display an image on the display and input unit 204.

Furthermore, the main control unit 220 executes display control for the display panel 202 and operation detection control for detecting the user operation through the operation unit 207 and the operation panel 203.

By executing the display control, the main control unit 220 displays an icon for starting the application software or a software key such as a scroll bar or displays a window for creating an electronic mail.

The scroll bar refers to a software key for receiving an instruction to move a display part of a large image or the like that does not fit in the display region of the display panel 202.

In addition, by executing the operation detection control, the main control unit 220 detects the user operation through the operation unit 207, receives an operation with respect to the icon and an input of a text string in an input field of the window through the operation panel 203, or receives a request for scrolling the display image through the scroll bar.

Furthermore, by executing the operation detection control, the main control unit 220 has a touch panel control function of determining whether the operation position on the operation panel 203 is in the overlapping part (display region) in overlap with the display panel 202 or the other edge part (non-display region) not in overlap with the display panel 202 and controlling the sensitive region of the operation panel 203 or a display position of the software key.

In addition, the main control unit 220 can detect a gesture operation with respect to the operation panel 203 and execute a preset function depending on the detected gesture operation.

The gesture operation is not a simple touch operation in the relate art and means an operation of drawing a trajectory by the finger or the like, designating a plurality of positions at the same time, or drawing a trajectory for at least one of the plurality of positions as a combination thereof.

The camera unit 208 includes configurations other than the external memory control unit 20, the storage medium 21, the display controller 22, the display surface 23, and the operation unit 14 in the digital camera 100 illustrated in FIG. 1.

The captured image data generated by the camera unit 208 can be stored in the storage unit 212 or be output through the external input-output unit 213 or the wireless communication unit 210.

In the smartphone 200 illustrated in FIG. 8, the camera unit 208 is mounted on the same surface as the display and input unit 204. However, the mount position of the camera unit 208 is not for limitation purposes. The camera unit 208 may be mounted on a rear surface of the display and input unit 204.

In addition, the camera unit 208 can be used in various functions of the smartphone 200. For example, an image acquired by the camera unit 208 can be displayed on the display panel 202, or the image of the camera unit 208 can be used as one of operation inputs of the operation panel 203.

In addition, in a case where the GPS reception unit 214 detects the position, the position can be detected by referring to the image from the camera unit 208. Furthermore, by referring to the image from the camera unit 208, an optical axis direction of the camera unit 208 of the smartphone 200 can be determined, or the current usage environment can be determined without using the three-axis acceleration sensor or using the three-axis acceleration sensor. The image from the camera unit 208 can also be used in the application software.

Besides, image data of a still image or a motion image to which the positional information acquired by the GPS reception unit 214, voice information (may be text information acquired by performing voice to text conversion by the main control unit or the like) acquired by the microphone 206, attitude information acquired by the motion sensor unit 215, or the like is added can be stored in the storage unit 212 or be output through the external input-output unit 213 or the wireless communication unit 210.

Even in the smartphone 200 having the above configuration, high-speed imaging in which the flicker is suppressed can be performed.

In the digital camera 100 in FIG. 1, the variable ND filter 3 and the ND drive unit 3A may be incorporated in the attachable and detachable lens device 40A, and the lens control unit 4 may control the ND drive unit 3A in accordance with an instruction from the system control unit 11. In this case, for example, a method of changing transmittance by relatively rotating two light reduction filters as the variable ND filter 3 may be used.

As described thus far, the following matters are disclosed in the present specification.

(1)

An imaging control device comprising an imaging controller that obtains captured image data by controlling an imager imaging a subject through an optical element having variable transmittance of light, a flicker detector that detects a flicker occurring in the captured image data based on the captured image data, and a transmittance controller that controls the transmittance of the optical element to a state where a quantity of light incident on the imager is changed in a cycle shorter than a cycle of the flicker based on the flicker, in which the imaging controller controls an exposure time of the imager to a natural multiple of a changing cycle of the quantity of light incident on the imager in a condition where the transmittance of the optical element is controlled to the state.

(2)

The imaging control device according to (1), in which the transmittance controller controls a ratio of the transmittance of the optical element at a timing at which a quantity of light from a light source causing the flicker is highest and the transmittance of the optical element at a timing at which the quantity of light is lowest to a value matching a ratio of a lowest value and a highest value of the quantity of light from the light source based on the flicker.

(3)

The imaging control device according to (1) or (2), in which the transmittance controller changes the transmittance of the optical element in a constant cycle that is shifted in phase with respect to the cycle of the flicker.

(4)

The imaging control device according to (3), in which the transmittance controller changes the transmittance of the optical element in a constant cycle that is shifted in phase with respect to the cycle of the flicker by 90 degrees.

(5)

The imaging control device according to (1) or (2), in which the transmittance controller changes the transmittance of the optical element in a cycle shorter than the cycle of the flicker.

(6)

The imaging control device according to (5), in which the transmittance controller changes the transmittance in accordance with a function of time t obtained by calculating $|\sin\{2\pi ft+(\pi/2)\}|\times|\sin\{2\pi fkt+(\pi/2)\}|$ in a case where f denotes a frequency of the flicker, t denotes time, k denotes a natural number greater than or equal to 2, and $\pi$ denotes a circular constant.

(7)

An imaging apparatus comprising the imaging control device according to any one of (1) to (6), and the imager.

(8)

The imaging apparatus according to (7), further comprising the optical element.

(9)

An imaging control method comprising an imaging control step of obtaining captured image data by controlling an imager imaging a subject through an optical element having variable transmittance of light, a flicker detection step of detecting a flicker occurring in the captured image data based on the captured image data, and a transmittance control step of controlling the transmittance of the optical element to a state where a quantity of light incident on the imager is changed in a cycle shorter than a cycle of the flicker based on the flicker, in which in the imaging control step, an exposure time of the imager is controlled to a natural multiple of a changing cycle of the quantity of light incident on the imager in a condition where the transmittance of the optical element is controlled to the state.

(10)

The imaging control method according to (9), in which in the transmittance control step, a ratio of the transmittance of the optical element at a timing at which a quantity of light from a light source causing the flicker is highest and the transmittance of the optical element at a timing at which the quantity of light is lowest is controlled to a value matching a ratio of a lowest value and a highest value of the quantity of light from the light source based on the flicker.

(11)

The imaging control method according to (9) or (10), in which in the transmittance control step, the transmittance of the optical element is changed in a constant cycle that is shifted in phase with respect to the cycle of the flicker.

(12)

The imaging control method according to (11), in which in the transmittance control step, the transmittance of the optical element is changed in a constant cycle that is shifted in phase with respect to the cycle of the flicker by 90 degrees.

(13)

The imaging control method according to (9) or (10), in which in the transmittance control step, the transmittance of the optical element is changed in a cycle shorter than the cycle of the flicker.

(14)

The imaging control method according to (13), in which in the transmittance control step, the transmittance is changed in accordance with a function of time t obtained by calculating $|\sin\{2\pi ft+(\pi/2)\}|\times|\sin\{2\pi fkt+(\pi/2)\}|$ in a case where f denotes a frequency of the flicker, t denotes time, k denotes a natural number greater than or equal to 2, and $\pi$ denotes a circular constant.

(15)

An imaging control program causing a computer to execute an imaging control step of obtaining captured image data by controlling an imager imaging a subject through an optical element having variable transmittance of light, a flicker detection step of detecting a flicker occurring in the captured image data based on the captured image data, and a transmittance control step of controlling the transmittance of the optical element to a state where a quantity of light incident on the imager is changed in a cycle shorter than a cycle of the flicker based on the flicker, in which in the imaging control step, an exposure time of the imager is controlled to a natural multiple of a changing cycle of the quantity of light incident on the imager in a condition where the transmittance of the optical element is controlled to the state.

While various embodiments are described above with reference to the drawings, the present invention is not limited to such examples. It is apparent that those skilled in the art may perceive various modification examples or correction examples within the scope disclosed in the claims, and those examples are also understood as falling in the technical scope of the present invention. Various constituents in the embodiment may be combined in any manner without departing from the gist of the invention.

The present application is based on Japanese Patent Application (JP2018-045932) filed on Mar. 13, 2018, the content of which is incorporated in the present application by reference.

According to the present invention, an imaging control device, an imaging apparatus, an imaging control method, and an imaging control program capable of suppressing a flicker in a case of performing imaging in an exposure time shorter than a blinking cycle of a light source by simple control can be provided.

EXPLANATION OF REFERENCES

100: digital camera
40A: lens device
1: imaging lens
2: stop
4: lens control unit
8: lens drive unit
9: stop drive unit
40B: main body unit
3: variable ND filter
3A: ND drive unit
5: imager
5A: imager drive unit
11: system control unit
11A: imaging controller
11B: flicker detector
11C: transmittance controller
14: operation unit
15: memory control unit
16: memory
17: digital signal processing unit
20: external memory control unit
21: storage medium
22: display controller
23: display surface
24: control bus
25: data bus
FL: flicker waveform
NL: transmittance waveform
IL: subject light quantity waveform
T1, T2, T3: cycle
200: smartphone
201: casing
202: display panel
203: operation panel
204: display and input unit
205: speaker
206: microphone
207: operation unit
208: camera unit
210: wireless communication unit
211: call unit
212: storage unit
213: external input-output unit
214: GPS reception unit
215: motion sensor unit
216: power supply unit
217: internal storage unit
218: external storage unit
220: main control unit
ST1 to STn: GPS satellite

What is claimed is:

1. An imaging control device comprising:
an imaging controller that obtains captured image data by controlling an imager imaging a subject through an optical element having variable transmittance of light;
a flicker detector that detects a flicker occurring in the captured image data based on the captured image data; and
a transmittance controller that controls, based on the flicker, the transmittance of the optical element to a state where a quantity of light incident on the imager changes in a cycle shorter than a cycle of the flicker,
wherein the imaging controller controls an exposure time of the imager to a natural multiple of a changing cycle of the quantity of light incident on the imager in a condition where the transmittance of the optical element is controlled to the state.

2. The imaging control device according to claim 1, wherein the transmittance controller controls a ratio of the transmittance of the optical element at a timing at which a quantity of light from a light source causing the flicker is highest and the transmittance of the optical element at a timing at which the quantity of light is lowest to a value matching a ratio of a lowest value and a highest value of the quantity of light from the light source based on the flicker.

3. The imaging control device according to claim 1, wherein the transmittance controller changes the transmittance of the optical element in a constant cycle that is shifted in phase with respect to the cycle of the flicker.

4. The imaging control device according to claim 3, wherein the transmittance controller changes the transmittance of the optical element in a constant cycle that is shifted in phase with respect to the cycle of the flicker by 90 degrees.

5. The imaging control device according to claim 1, wherein the transmittance controller changes the transmittance in accordance with a function of time t obtained by calculating $|\sin\{2\pi ft+(\pi/2)\}|\times|\sin\{2\pi fkt+(\pi/2)\}|$ in a case where f denotes a frequency of the flicker, t denotes time, k denotes a natural number greater than or equal to 2, and n denotes a circular constant.

6. An imaging apparatus comprising:
the imaging control device according to claim 1; and the imager.

7. The imaging apparatus according to claim 6, further comprising:
the optical element.

8. An imaging control method comprising:
an imaging control step of obtaining captured image data by controlling an imager imaging a subject through an optical element having variable transmittance of light;
a flicker detection step of detecting a flicker occurring in the captured image data based on the captured image data; and
a transmittance control step of controlling, based on the flicker, the transmittance of the optical element to a state where a quantity of light incident on the imager changes in a cycle shorter than a cycle of the flicker,
wherein, in the imaging control step, an exposure time of the imager is controlled to a natural multiple of a changing cycle of the quantity of light incident on the imager in a condition where the transmittance of the optical element is controlled to the state.

9. The imaging control method according to claim 8, wherein, in the transmittance control step, a ratio of the transmittance of the optical element at a timing at which a quantity of light from a light source causing the flicker is highest and the transmittance of the optical element at a timing at which the quantity of light is lowest is controlled to a value matching a ratio of a lowest value and a highest value of the quantity of light from the light source based on the flicker.

10. The imaging control method according to claim 8, wherein, in the transmittance control step, the transmittance of the optical element is changed in a constant cycle that is shifted in phase with respect to the cycle of the flicker.

11. The imaging control method according to claim 10, wherein, in the transmittance control step, the transmittance of the optical element is changed in a constant cycle that is shifted in phase with respect to the cycle of the flicker by 90 degrees.

12. The imaging control method according to claim 8, wherein, in the transmittance control step, the transmittance is changed in accordance with a function of time t obtained by calculating $|\sin\{2\pi ft+(\pi/2)\}|\times|\sin\{2\pi fkt+(\pi/2)\}|$ in a case where f denotes a frequency of the flicker, t denotes time, k denotes a natural number greater than or equal to 2, and n denotes a circular constant.

13. A non-transitory computer-readable medium storing an imaging control program causing a computer to execute:
an imaging control step of obtaining captured image data by controlling an imager imaging a subject through an optical element having variable transmittance of light;
a flicker detection step of detecting a flicker occurring in the captured image data based on the captured image data; and
a transmittance control step of controlling, based on the flicker, the transmittance of the optical element to a state where a quantity of light incident on the imager changes in a cycle shorter than a cycle of the flicker,
wherein, in the imaging control step, an exposure time of the imager is controlled to a natural multiple of a changing cycle of the quantity of light incident on the imager in a condition where the transmittance of the optical element is controlled to the state.

* * * * *